US009460416B2

(12) United States Patent
Penner

(10) Patent No.: US 9,460,416 B2
(45) Date of Patent: Oct. 4, 2016

(54) READING MODE FOR INTERACTIVE SLIDE PRESENTATIONS WITH ACCOMPANYING NOTES

(75) Inventor: Nathan Robert Penner, Mountian View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 13/586,865

(22) Filed: Aug. 16, 2012

(65) Prior Publication Data
US 2014/0053071 A1     Feb. 20, 2014

(51) Int. Cl.
*G06F 3/01* (2006.01)
*G06F 17/24* (2006.01)
*G06Q 10/10* (2012.01)
*G06Q 50/00* (2012.01)

(52) U.S. Cl.
CPC ............. *G06Q 10/10* (2013.01); *G06Q 50/01* (2013.01)

(58) Field of Classification Search
CPC ............. G06F 3/0481; G06F 17/241; G06F 17/2235; G06Q 30/0241
USPC .......... 715/730, 732; 345/157, 173; 709/218
See application file for complete search history.

(56) References Cited

U.S. PATENT DOCUMENTS

| 6,193,065 | B1 * | 2/2001 | Salomone ..................... 206/455 |
| 6,687,878 | B1 * | 2/2004 | Eintracht ............. G06F 17/241 707/E17.117 |
| 6,766,331 | B2 * | 7/2004 | Shema et al. |
| 6,943,752 | B2 * | 9/2005 | Masumoto et al. ........... 345/1.1 |
| 6,966,035 | B1 * | 11/2005 | Suess et al. .................. 715/753 |
| 7,327,376 | B2 * | 2/2008 | Shen et al. .................... 345/676 |
| 7,380,211 | B2 * | 5/2008 | Coulomb et al. ............. 715/730 |
| 7,392,475 | B1 * | 6/2008 | Leban et al. ................ 715/255 |
| 7,517,098 | B2 * | 4/2009 | Savilampi .................... 353/121 |
| 7,640,502 | B2 | 12/2009 | Xu et al. |
| 7,707,502 | B2 * | 4/2010 | Coulomb et al. ............. 715/730 |
| 7,864,163 | B2 * | 1/2011 | Ording et al. ................ 345/173 |
| 8,260,489 | B2 * | 9/2012 | Nielsen et al. .............. 701/32.2 |
| 8,456,417 | B2 * | 6/2013 | Fang ............................ 345/157 |
| 8,504,711 | B1 * | 8/2013 | Lunt ............................ 709/231 |
| 2003/0101237 | A1 * | 5/2003 | Ban et al. ..................... 709/218 |

(Continued)

OTHER PUBLICATIONS

"View All Your Notes While Making a Presentation", Retrieved at <<http://www.labnol.org/software/see-speaker-notes-during-presentation/17927/>> Oct. 12, 2010, pp. 4.

(Continued)

*Primary Examiner* — Jennifer To
*Assistant Examiner* — Jasmine Wan
(74) *Attorney, Agent, or Firm* — Julie Kane Akhter; Tom Wong; Micky Minhas

(57) ABSTRACT

Concepts and technologies are described herein for providing interactive slide presentations with accompanying notes in a reading mode of a presentation application program. In accordance with some of the concepts and technologies disclosed herein, a computer-implemented method includes computer-implemented operations for providing a reading mode user interface that includes a presentation object including a slide placeholder and a notes placeholder. The method may also include displaying slide content within the slide placeholder in the reading mode user interface. The method may also include moving the presentation object out of a view and a new presentation object into the view in response to an input. The method may also include scaling the new presentation object.

20 Claims, 13 Drawing Sheets

(56) References Cited

U.S. PATENT DOCUMENTS

| | | | |
|---|---|---|---|
| 2006/0218004 A1* | 9/2006 | Dworkin et al. | 705/1 |
| 2007/0168959 A1* | 7/2007 | Bayari et al. | 717/120 |
| 2007/0282948 A1 | 12/2007 | Praino et al. | |
| 2008/0222531 A1* | 9/2008 | Davidson | G06Q 10/107 715/736 |
| 2008/0229218 A1* | 9/2008 | Maeng | 715/760 |
| 2008/0282167 A1* | 11/2008 | Beamish | 715/730 |
| 2009/0164266 A1* | 6/2009 | Lakhani et al. | 705/7 |
| 2009/0318168 A1* | 12/2009 | Khosravy | G06Q 30/0241 455/456.3 |
| 2010/0023878 A1* | 1/2010 | Douris et al. | 715/757 |
| 2010/0169790 A1* | 7/2010 | Vaughan et al. | 715/740 |
| 2010/0235756 A1* | 9/2010 | Yoshihama | G06F 17/2235 715/745 |
| 2010/0251122 A1 | 9/2010 | Lee et al. | |
| 2011/0145164 A1* | 6/2011 | Lavoie et al. | 705/36 R |
| 2012/0147053 A1* | 6/2012 | Yamamoto et al. | 345/667 |
| 2013/0036081 A1* | 2/2013 | Tateno | G06N 5/022 706/46 |
| 2013/0067336 A1* | 3/2013 | Villaron et al. | 715/732 |
| 2013/0088511 A1* | 4/2013 | Mitra et al. | 345/629 |
| 2014/0033069 A1* | 1/2014 | Chegini et al. | 715/751 |

OTHER PUBLICATIONS

Gilbert, Jody, "Take advantage of PowerPoint's Notes feature", Retrieved at <<http://www.techrepublic.com/article/take-advantage-of-powerpoints-notes-feature/1038185>> Sep. 2, 1999, pp. 3.

"Share presentations in the Share pod", retrieved at <<http://help.adobe.com/en_US/Connect/6.0/Enterprise/help.html?content=WSD05DAB5D-4260-489d-830D-CE2037C52452.html>> Retrieved Date: May 25, 2012, pp. 2.

Klein, David, "SlideShark Update: Presenter Mode with Slide Notes, iPad 1 Projection, and more", Retrieved at <<http://www.brainshark.com/ideas-blog/brainshark-articles/slideshark-v-1-6.aspx>> May 16, 2012, pp. 12.

International Search Report dated Jan. 2, 2014 in International Application No. PCT/US13/054594.

* cited by examiner

READING MODE FOR INTERACTIVE SLIDE PRESENTATIONS WITH ACCOMPANYING NOTES

BACKGROUND

Presentation application programs, such as MICROSOFT POWERPOINT, available from Microsoft of Redmond, Wash., allow users to create individual pages or "slides" for presentation in the form of a slide show. Each slide may contain text, graphics, sound, videos, and/or other objects. Animations may be applied to certain objects in a slide, such as text and graphics, to enhance the slide show.

Presentation application programs are primarily suited for editing and presenting content. Many users, however, utilize presentation application programs to read presentation documents. Currently, users can read presentations in MICROSOFT POWERPOINT using a normal editing mode in which a user can see context for a slide thumbnail and content in a slide pane, and refer to explanatory notes from the presenter in a notes pane. In the normal editing mode, users are unable to view animations, sound, videos, and other interactive content. Moreover, an editing user interface dominates the normal editing mode; this may be intimidating to users simply trying to read the presentation with explanatory notes. In a slide show mode, users can view the presentation in full fidelity, including animations, sounds, videos, and other interactive content, but, in doing so, lose all context provided by explanatory notes, and cannot easily navigate to other portions of the presentation.

It is with respect to these and other considerations that the disclosure made herein is presented.

SUMMARY

Concepts and technologies are described herein for providing interactive slide presentations with accompanying notes in a reading mode of a presentation application program. According to the concepts and technologies described herein, a reading mode user interface is utilized, in part, to provide a reading view in which presentation notes can be displayed alongside a presentation slide, provide dynamic slide content and enable interactivity in the reading view, p provide a navigation model for switching between slides that represent slide content and accompanying notes as a single cohesive object, and to scale a slide based upon whether the slide has accompany notes.

According to one aspect disclosed herein, a computer-implemented method includes computer-implemented operations for providing a reading mode user interface including a presentation object. The presentation object may include a slide placeholder and a notes placeholder. The method may also include displaying slide content within the slide placeholder. In some embodiments, the method also includes receiving an input to interact with the slide content and manipulating the slide content in response to the input. In some embodiments, the method also includes receiving an input to advance to a new presentation object.

According to another aspect disclosed herein, a computer-readable storage medium includes computer-executable instructions that, when executed by a computer, cause the computer to present, on a display that is in communication with the computer, a reading mode user interface. The reading mode user interface may include a presentation object that represents slide content and presentation notes. The presentation object may include a slide placeholder configured to show the slide content and a notes placeholder configured to show the presentation notes. The instructions may also cause the computer to receive an input to interact with the slide content, and to manipulate the slide content in response to the input.

In some embodiments, the input to interact with the slide content includes an operation to manipulate playback of a video contained within the slide content, an operation to manipulate playback of a sound contained within the slide content, a selection of a hyperlink contained within the slide content, or an operation to manipulate playback of one or more animations associated with one or more objects contained within the slide content.

In some embodiments, the computer-readable storage medium also includes computer-executable instruction that, when executed by the computer, cause the computer to receive an input to advance from the presentation object to a new presentation object, and in response to the input to advance from the presentation object to the new presentation object, move the presentation object out of a view and the new presentation object into the view.

According to another aspect disclosed herein, a computer-readable storage medium includes computer-executable instructions that, when executed by a computer, cause the computer to present, on a display that is in communication with the computer, a slide presentation in a reading mode user interface of a presentation application program. The reading mode user interface may be configured to represent, for each slide in the slide presentation, slide content in a slide placeholder and, if available, presentation notes in a notes placeholder as a cohesive presentation object. The instructions may also cause the computer to provide a navigation model for switching between the cohesive presentation objects.

In some embodiments, the computer-readable storage medium also includes computer-executable instruction that, when executed by the computer, cause the computer to receive, via the reading mode user interface, an input to utilize the navigation model to switch from a first slide in the slide presentation to a second slide in the slide presentation. The first slide may be represented as a first cohesive presentation object including first slide content in a first slide placeholder and first presentation notes in a first notes placeholder. The second slide may be represented as a second cohesive presentation object including second slide content in a second slide placeholder. The instructions may also cause the computer to, in response to the input, advance the slide presentation from the first slide to the second slide by moving the first cohesive presentation object out of a view and the second cohesive presentation object into the view. In some embodiments, the instructions may also cause the computer to scale the second slide placeholder to be larger than the first slide placeholder.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
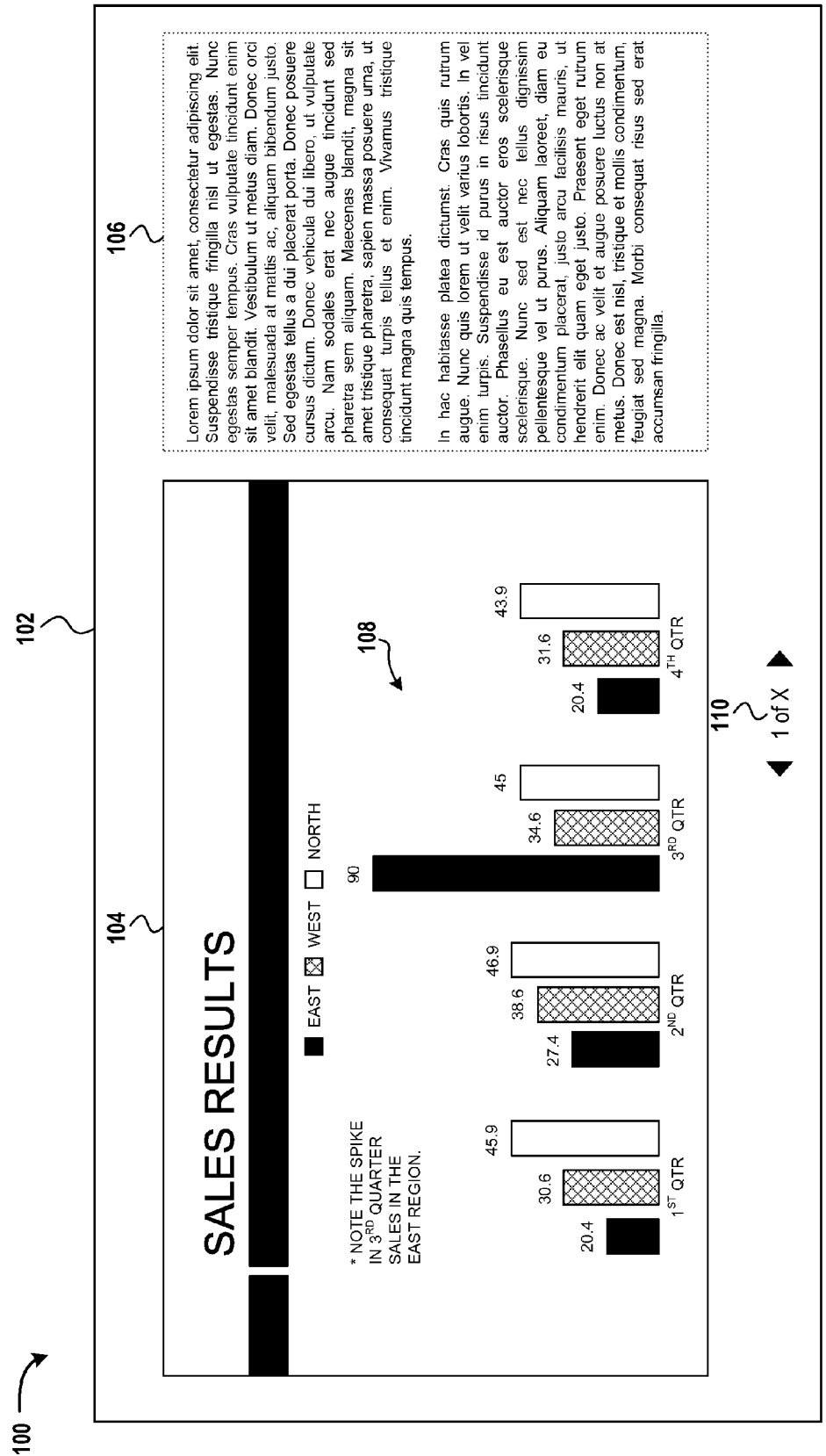
FIG. 1 is a user interface diagram illustrating aspects of a reading mode of a presentation application program, according to an illustrative embodiment.

Users read presentation documents for a variety of purposes. Users may scan a presentation document for relevant content. When reading a presentation document for the first time, users often scan the presentation document to get a sense of what information it contains, scan for relevant information, skim through some slides, and read other slides in detail. Users may look for something specific in a presentation documents. Often times, users open a presentation document to look for a specific slide or piece of information they have seen before. Users may be looking for a slide they saw in a recent meeting, something they presented, or something they read in an email attachment. Users may be looking at specific slides as part of a larger workflow, which may include other tasks that benefit from reference to the presentation document. Some users may read a presentation document from start to finish as if it were being presented to them.

The following detailed description is directed to concepts and technologies for providing interactive slide presentations with accompanying notes in a reading mode of a presentation application program. According to the concepts and technologies described herein, a reading mode user interface is utilized, in part, to provide a reading view in which presentation notes can be displayed alongside a presentation slide, provide dynamic slide content and enable interactivity in the reading view, provide a navigation model for switching slides that represents a slide and accompanying notes as a single cohesive object, and to scale a slide based upon whether the slide has accompanying notes.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing interactive slide presentations with accompanying notes in a reading mode of a presentation application program will be presented.

FIG. 1 is a user interface diagram illustrating aspects of a reading mode of a presentation application program, according to an illustrative embodiment. In particular, FIG. 1 shows an illustrative reading mode user interface 100 provided by a presentation application program according to one implementation disclosed herein. As will be described in greater detail below, the reading mode user interface 100 is utilized, in part, to provide a reading view in which presentation notes can be displayed alongside a presentation slide, provide dynamic slide content and enable interactivity in the reading view, provide a navigation model for switching between slides that represent slide content and accompanying notes as a single cohesive object, and to scale a slide based upon whether the slide has accompanying notes.

In the illustrated embodiment, the reading mode user interface 100 provides a reading view window 102 that includes a slide placeholder 104 and a notes placeholder 106. Although not shown in the illustrated embodiment, the reading view window 102, in some embodiments, additionally includes one or more commands provided via one or more menus, icons, and/or ribbon interfaces. The command(s) may provide, for example, a function to switch between a reading mode and one or more other modes such as an editing mode and/or a slide show mode.

The slide placeholder 104 is configured to show slide content 108. The slide content 108 may include text, graphics, videos, hyperlinks, and/or other objects. The slide content 108 may additionally include animations applied to certain objects to enhance the presentation.

The notes placeholder 106 is configured to show notes associated with the slide content 108. The notes may provide context for the slide content 108. Moreover, the notes may be provided by one or more authors of the presentation and/or one or more presenters of the presentation. In the illustrated embodiment, the notes placeholder 106 is shown as a vertical column located to the right of the slide placeholder 104. It should be understood, however, that, in some embodiments, the notes placeholder 106 is positioned to the left of the slide placeholder 104, above the slide placeholder 104, below the slide placeholder 104, otherwise adjacent to the slide placeholder 104, or elsewhere within the reading view window 102. The shape of the notes placeholder 106 and/or the slide placeholder 104 may be modified to accommodate the needs of the author(s) and/or presenter(s) of a presentation.

In the reading mode, the slide placeholder 104 and the notes placeholder 106 are treated by the presentation application program as a single cohesive object. In other words, the slide placeholder 104 and the notes placeholder 106 are configured to be scaled and moved (e.g., during a slide advance operation) as one. It is contemplated, however, that a hide/show command may be used to hide/show the notes placeholder 106. Implementation of the hide/show command may apply to all slides within a presentation deck, to a group of slides, or to a single slide. In some embodiments, if the visibility of notes is toggled while viewing a slide with notes, the slide placeholder 104 is rescaled.

The illustrated reading view window 102 also includes a slide control 110. The slide control 110 is configured to allow a user to advance through slides within a presentation deck. The slide control 110 may be hidden for certain implementations, such as when the reading mode is being utilized on a touch-enabled computing device that allows a user to advance through slides via a swipe or other gesture.

Although only a single slide placeholder 104 and a single notes placeholder 106 have been described, one or more additional placeholders, panes, areas, or other user interface spaces may be provided in the reading mode user interface 100 concurrently with the above or in various different interactive states of the reading mode user interface 100. For instance, additional placeholders, panes, areas, or other user interface spaces might also be provided for displaying user interface icons or other types of user interface objects for initiating some of the functionality described herein and other functions including, but not limited to, other functions of presentation application programs such as MICROSOFT POWERPOINT, available from MICROSOFT CORPORATION of Redmond, Wash., and other functions not disclosed herein.

In this regard, it should be appreciated that the reading mode user interface 100 and the remainder of the user interfaces disclosed herein have been greatly simplified for purposes of discussion. The user interfaces described herein might include more or fewer components, might be arranged differently, and might operate in a different fashion while still remaining within the scope of the disclosure provided herein. It should also be appreciated that while various user input devices will be described with respect to the various embodiments disclosed herein, other types of user input mechanisms might also be utilized. For instance, although the various embodiments described herein are disclosed in conjunction with the use of a mouse user input device controlling a mouse cursor, a keyboard, and a touch screen interface, other types of user input devices and mechanisms such as proximity sensors, accelerometers, voice input, and others may be utilized.

Figure 2:
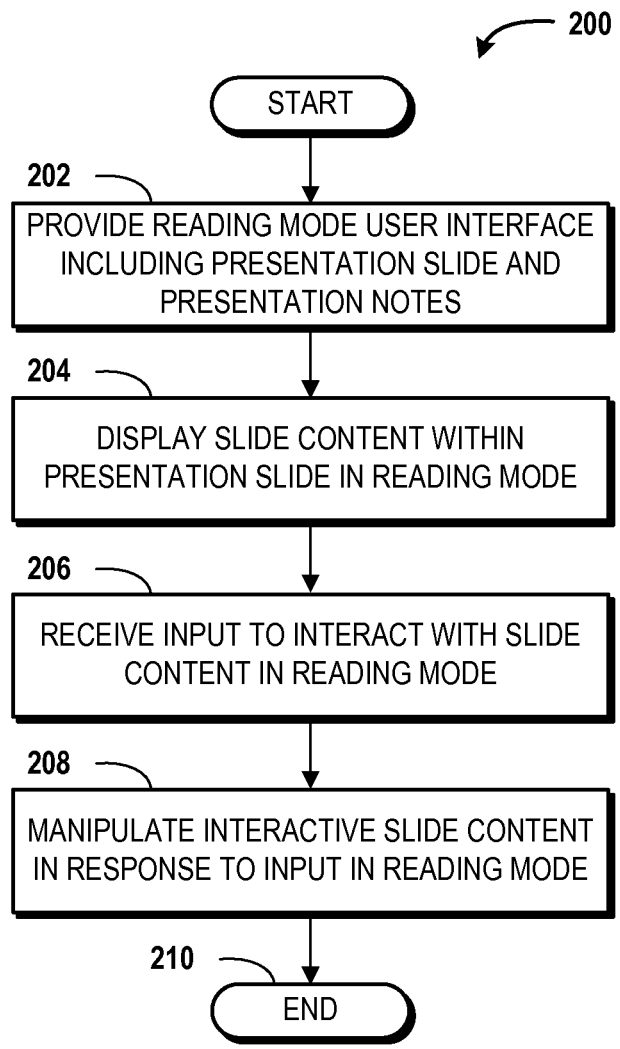
FIG. 2 is a flow diagram illustrating aspects of a method for providing a reading mode of a presentation application program, according to an illustrative embodiment.

FIG. 2 is a flow diagram illustrating aspects of a method 200 for providing a reading mode of a presentation application program, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described as being executed by a computer or other computing device, which may be configured like the computer or the computing device described herein below with reference to FIGS. 10 and 12, respectively. The method 200 will also be described with additional reference to FIG. 1.

The method 200 begins and proceeds to operation 202, wherein a computer executes a presentation application program to provide a reading mode user interface, such as the reading mode user interface 100, on a display operatively coupled to the computer. As will be described in greater detail below, the display may be included as part of the computer, such as for implementations in which the computer is a smart phone or tablet computing device. Alternatively, the display may be external to the computer and operatively coupled via a wired or wireless connection through which information to be displayed can be transmitted. The reading mode user interface may include a presentation slide in a slide placeholder, such as the slide placeholder 104, and presentation notes in a notes placeholder, such as the notes placeholder 106.

From operation 202, the method 200 proceeds to operation 204, wherein the computer displays slide content, such as the slide content 108, within the reading mode user interface. As explained above, the slide content 108 may include videos, hyperlinks, animations, and/or other interactive content. The method 200 includes operations to enable user interaction with the interactive content while in the reading mode of the presentation application program. It should be understood, however, that the presence of interactive content as part of the slide content does not require interaction, and may instead be viewed as static content.

From operation 204, the method 200 proceeds to operation 206, wherein the computer receives an input to interact with the slide content. The input may include, but is not limited to, an operation to manipulate playback of a video, an operation to manipulate playback of a sound, a selection of hyperlink, or an operation to manipulate playback of one or more animations. At operation 208, the computer manipulates the slide content according to the received input. From operation 208, the method 200 proceeds to operation 210, wherein the method 200 may end.

Figure 3:
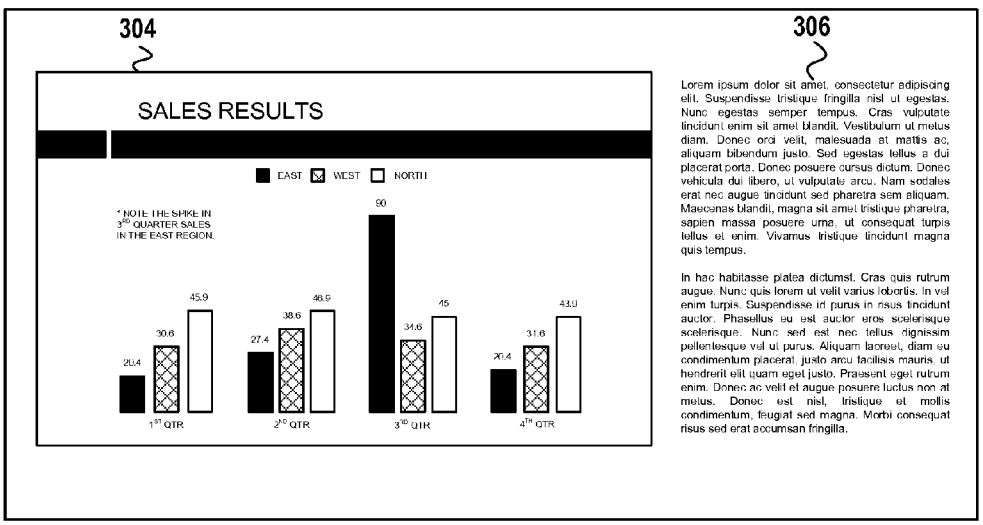
FIG. 3 is a user interface diagram illustrating aspects of a slide transition in a reading mode of a presentation application program, according to an illustrative embodiment.
Figure 3:
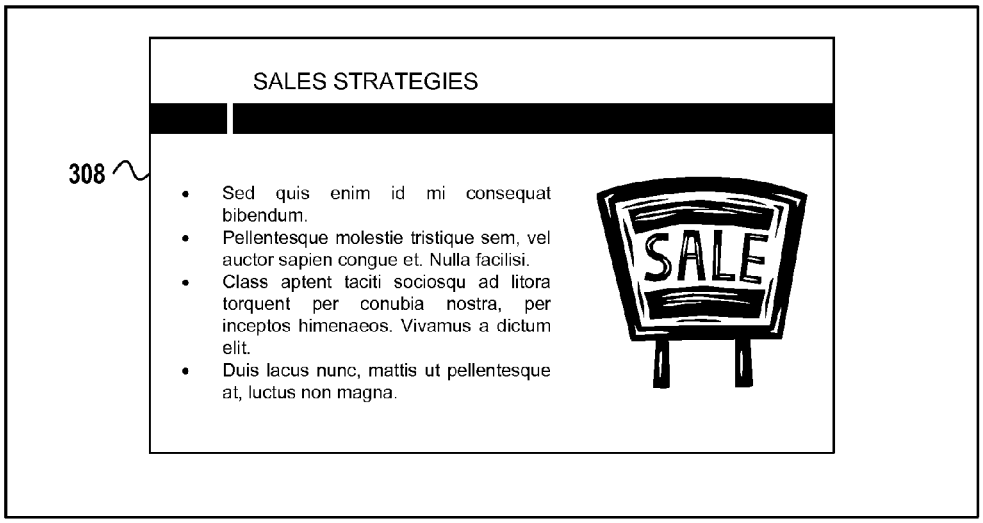

FIG. 3 is a user interface diagram illustrating aspects of a slide transition in a reading mode of a presentation application program, according to an illustrative embodiment. In the illustrated embodiment, a first presentation object 300 and a second presentation object 302 are shown. The first presentation object 300 includes a first slide placeholder 304 and a first notes placeholder 306. The second presentation object 302 includes a second slide placeholder 308. When a user provides an input to advance from a slide included in the first presentation object 300 to another slide included in the second presentation object 302, the first presentation object 300, including both the first slide placeholder 304 and the first notes placeholder 306, is moved out of view as a single cohesive object. Similarly, the second presentation object 302 is moved into view as another single cohesive object, even though the second presentation object 302 does not include a populated notes placeholder. Since the second presentation object 302 does not include a notes placeholder, the second slide placeholder 308 is scaled to be larger than the first slide placeholder 304 so that the area in the reading view that is occupied by the first notes placeholder 306 is no longer dedicated to the display of notes. In this manner, the user is provided with a larger view of the slide content included in the second slide placeholder 308.

Figure 4:
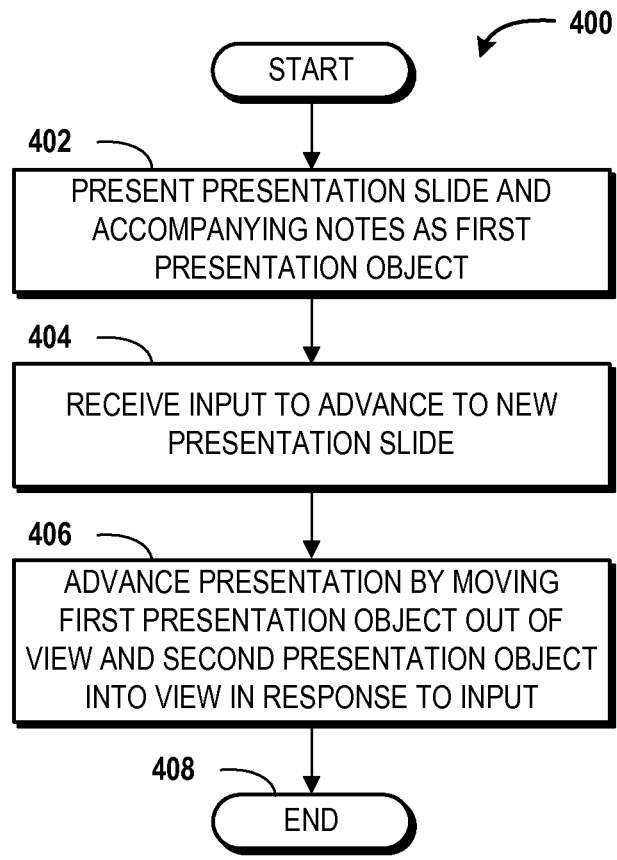
FIG. 4 is a flow diagram illustrating aspects of a method for advancing a presentation in a reading mode of a presentation application program, according to an illustrative embodiment.

FIG. 4 is a flow diagram illustrating aspects of a method 400 for advancing a presentation in a reading mode of a presentation application program, according to an illustrative embodiment. The method 400 will be described as being executed by a computer or other computing device, which may be configured like the computer or the computing device described herein below with reference to FIGS. 10 and 12, respectively. The method 400 will also be described with additional reference to FIG. 3.

The method 400 begins and proceeds to operation 402, wherein a computer presents a presentation slide and accompanying notes as a first presentation object, such as the first presentation object 300. From operation 402, the method 400 proceeds to operation 404, wherein the computer receives input to advance to a new presentation slide that is included in a second presentation object, such as the second presentation object 302. In response to the input, at operation 406, the computer advances the presentation by moving the first presentation object out of the reading view and the second presentation object into the reading view. Moving between two presentation objects may include rescaling a presentation object, as will be described in greater detail below with reference to FIGS. 5A and 5B. From operation 406, the method 400 proceeds to operation 408, wherein the method 400 may end.

Figure 5A:
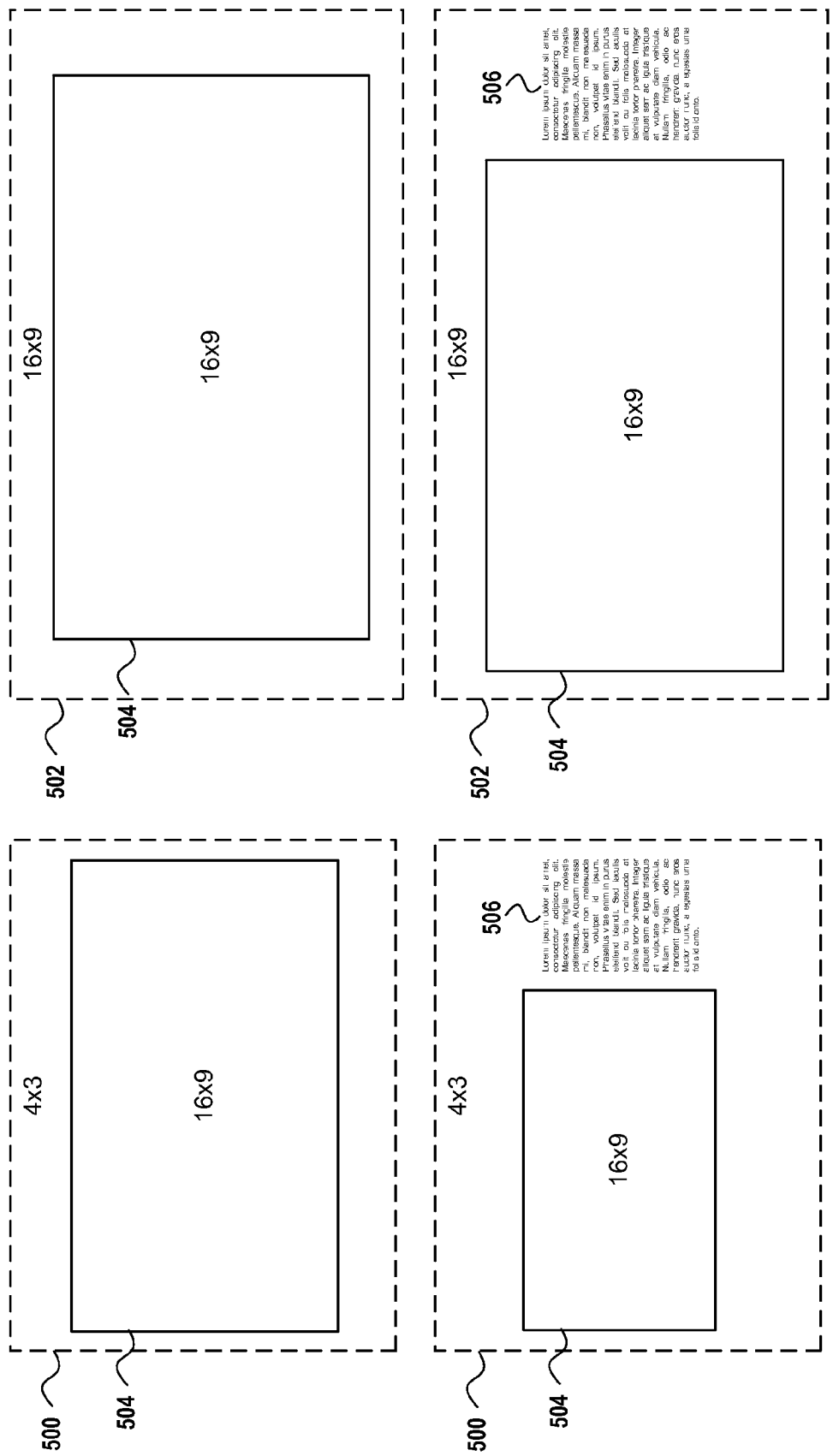
FIGS. 5A-5B are user interface diagrams illustrating slide and notes scaling in a reading mode of a presentation application program, according to an illustrative embodiment.
Figure 5B:
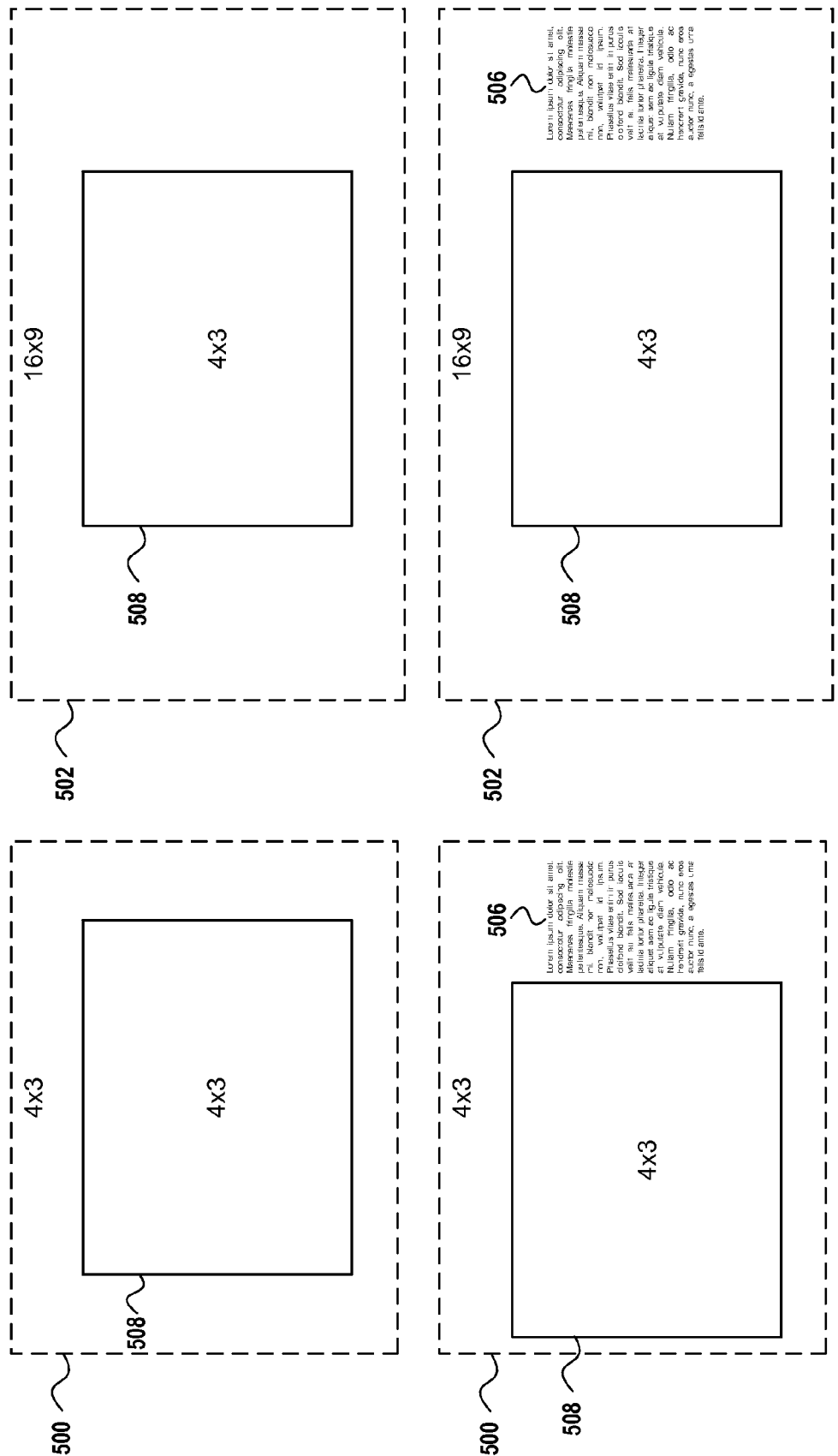

FIGS. 5A-5B are user interface diagrams illustrating slide and notes scaling in a reading mode of a presentation application program, according to an illustrative embodiment. Turning first to FIG. 5A, a 4×3 reading view window 500 and a 16×9 reading view window 502 are each shown with a 16×9 slide placeholder 504. The 4×3 reading view window 500 and the 16×9 reading view window 502 are shown with and without a notes placeholder 506. As can be seen from the illustrated examples, the 16×9 slide placeholder 504 can be scaled down to accommodate the notes placeholder 506. Likewise, the 16×9 slide placeholder 504 can be scaled up when the notes placeholder 506 is not populated. In this manner, transitions between presentation objects, such as described above with reference to FIGS. 3 and 4, can be seamlessly carried out with scaling applied to the 16×9 slide placeholder 504 and/or the notes placeholder 506 to accommodate the transitions. For instance, when transitioning from a presentation object that includes the 16×9 slide placeholder 504 and the notes placeholder 506 to another presentation object that includes only the 16×9 slide placeholder 504, the presentation application program can upscale the 16×9 slide placeholder 504 of the new presentation object to accommodate a greater portion of the 4×3 reading view window 500 or the 16×9 reading view window 502 depending upon the particular implementation.

Turning now to FIG. 5B, the 4×3 reading view window 500 and the 16×9 reading view window 502 are each shown with a 4×3 slide placeholder 508. The 4×3 reading view window 500 and the 16×9 reading view window 502 are also shown with and without a notes placeholder 506. As can be seen from the illustrated examples, the 4×3 slide placeholder 508 can be scaled down to accommodate the notes placeholder 506. Likewise, the 4×3 slide placeholder 508 can be scaled up when the notes placeholder 506 is not populated. In this manner, transitions between presentation objects, such as described above with reference to FIGS. 3 and 4, can be seamlessly carried out with scaling applied to the 4×3 slide placeholder 508 and/or the notes placeholder 506 to accommodate the transitions. For instance, when transitioning from a presentation object that includes the 4×3 slide placeholder 508 and the notes placeholder 506 to another presentation object that includes only the 4×3 slide placeholder 508, the presentation application program can upscale the 4×3 slide placeholder 508 of the new presentation object to accommodate a greater portion of the 4×3 reading view window 500 or the 16×9 reading view window 502 depending upon the particular implementation.

Although the examples shown in FIGS. 5A-5B refer to 4×3 and 16×9 aspect ratios for reading view windows and slide placeholders, reading view windows and slide placeholders are not limited to these aspects ratios. For instance, a 16×10 or other aspect ratio may be used for the reading view window and/or slide placeholder in some implementations. Moreover, the amount of scaling of the slide placeholders 504/508 and/or the note placeholder 506 may be any amount so as to accommodate a particular implementation. The amount of scaling may be fixed by the developer of the presentation application program. Alternatively, the amount of scaling may be adjustable by a user via one or more settings.

Figure 6:
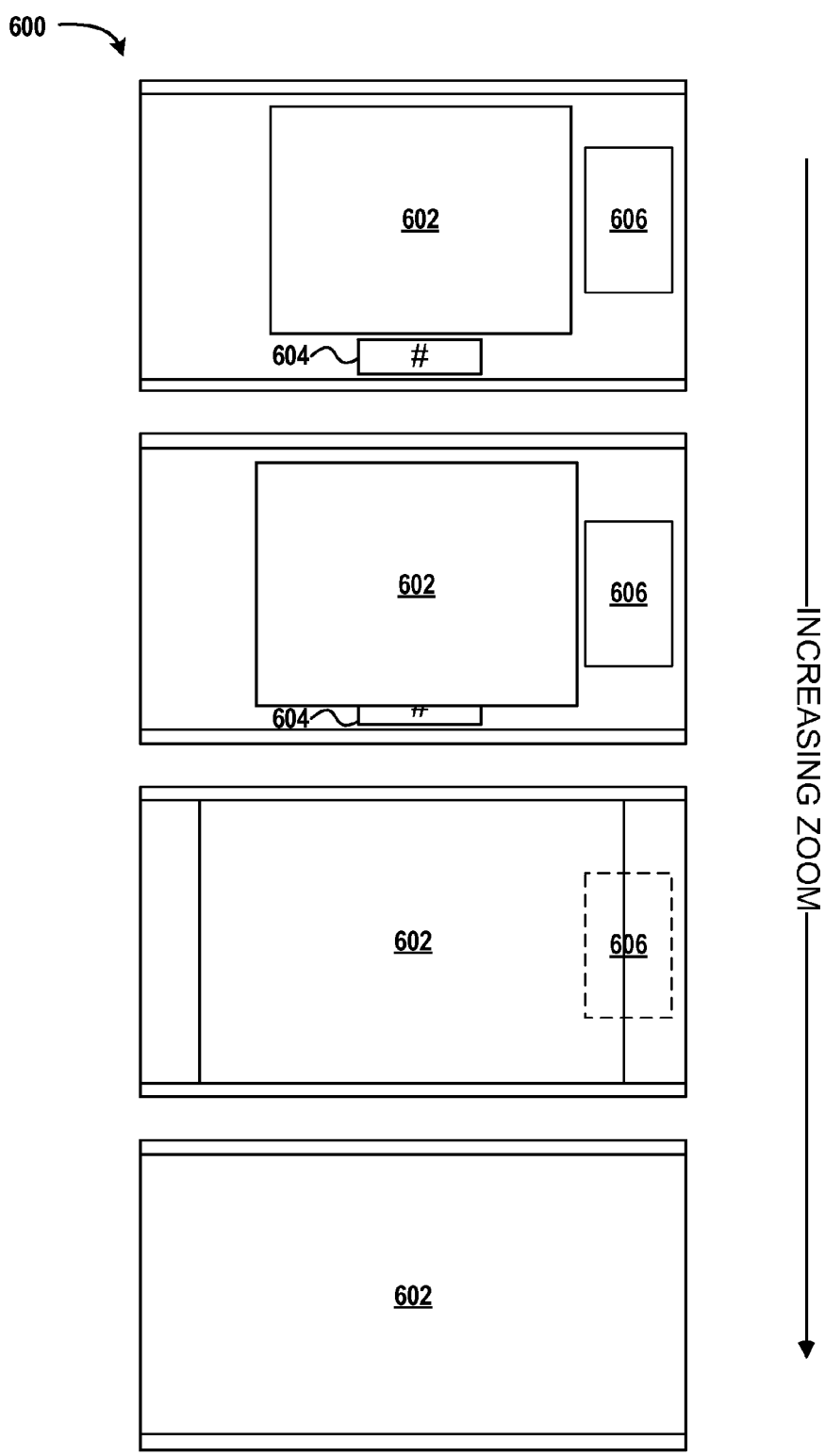
FIG. 6 is a user interface diagram illustrating aspects of a zoom function in a reading mode of a presentation application program, according to an illustrative embodiment.

FIG. 6 is a user interface diagram illustrating aspects of a zoom function in a reading mode of a presentation application program, according to an illustrative embodiment. In the illustrated embodiment, a reading view window 600 includes a zoomable slide placeholder 602, a control 604, and a notes placeholder 606. The zoomable slide placeholder 602 may include any slide content such as described above. The control 604 may allow a user to advance through slides in a presentation deck or provide some other control functionality. The notes placeholder 606, in the illustrated embodiment, is not zoomable, but may be zoomable in other embodiments. A user may zoom-in to the zoomable slide placeholder 602 to view more detail of slide content contained therein. A zoom-in operation may be performed by a touch gesture (e.g., pinch), a mouse input, a keyboard input, a voice input, or some other input. Zoom-out operations are also contemplated.

Figure 7:
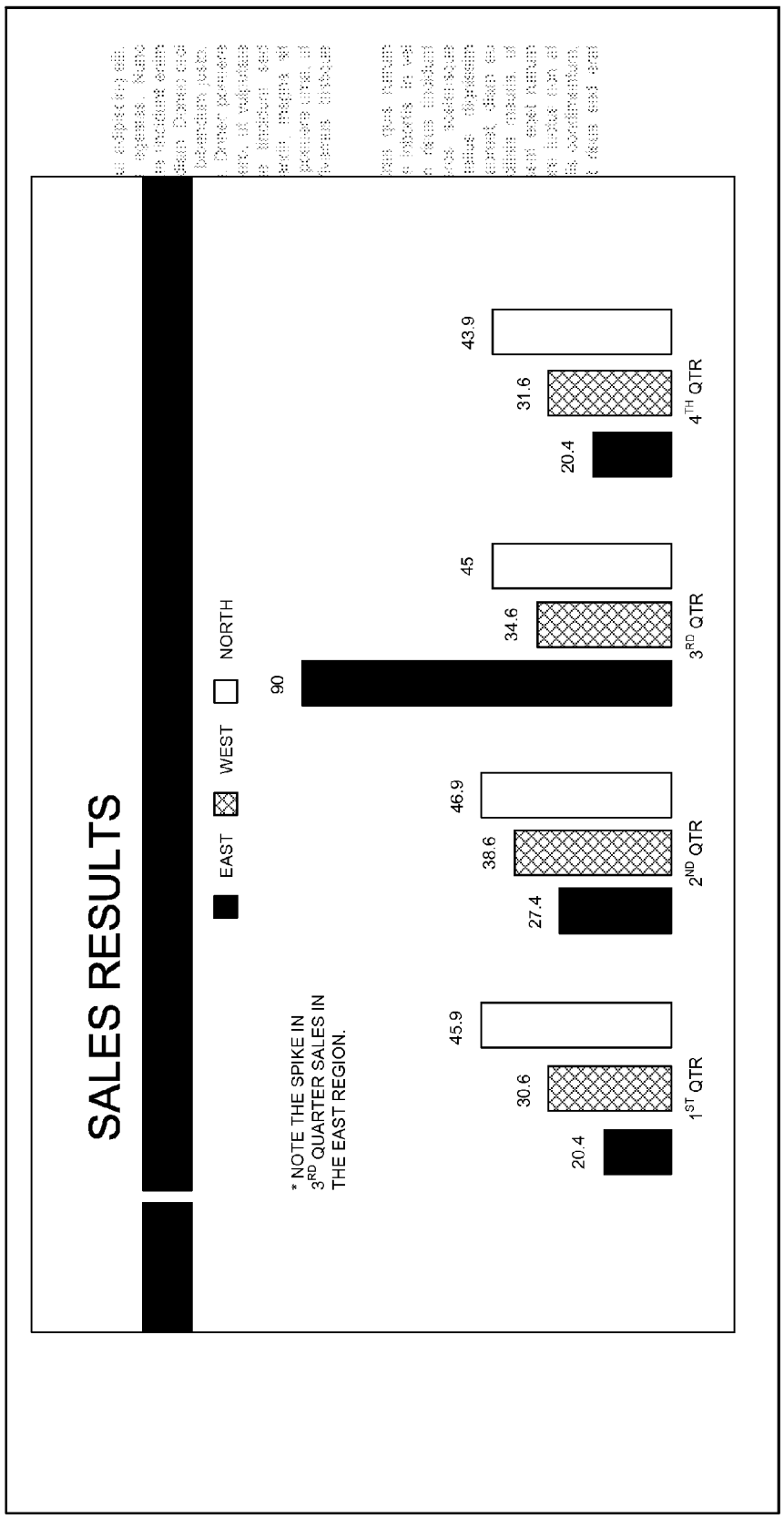
FIG. 7 is a user interface diagram illustrating aspects of a zoom function in a reading mode of a presentation application program, according to an illustrative embodiment.

In the illustrated embodiment, the reading view window 600 is shown in four states, each of which shows the zoomable slide placeholder 602 at a higher zoom level than the previous state. As the zoom level increases, the zoomable slide placeholder 602 increases in size and overlays the control 604 and the notes placeholder 606 until, at the last state, when only the zoomable slide placeholder 602 is visible. In other words, increasing the zoom level causes the zoomable slide placeholder 602 to be brought into the foreground, to increase in size, and to at least partially overlap the notes placeholder 606. FIG. 7 shows an example in which a zoomable slide placeholder, such as the zoomable slide placeholder 602, is zoomed so as to overlay a portion of notes shown in a notes placeholder, such as the notes placeholder 606.

Figure 8:
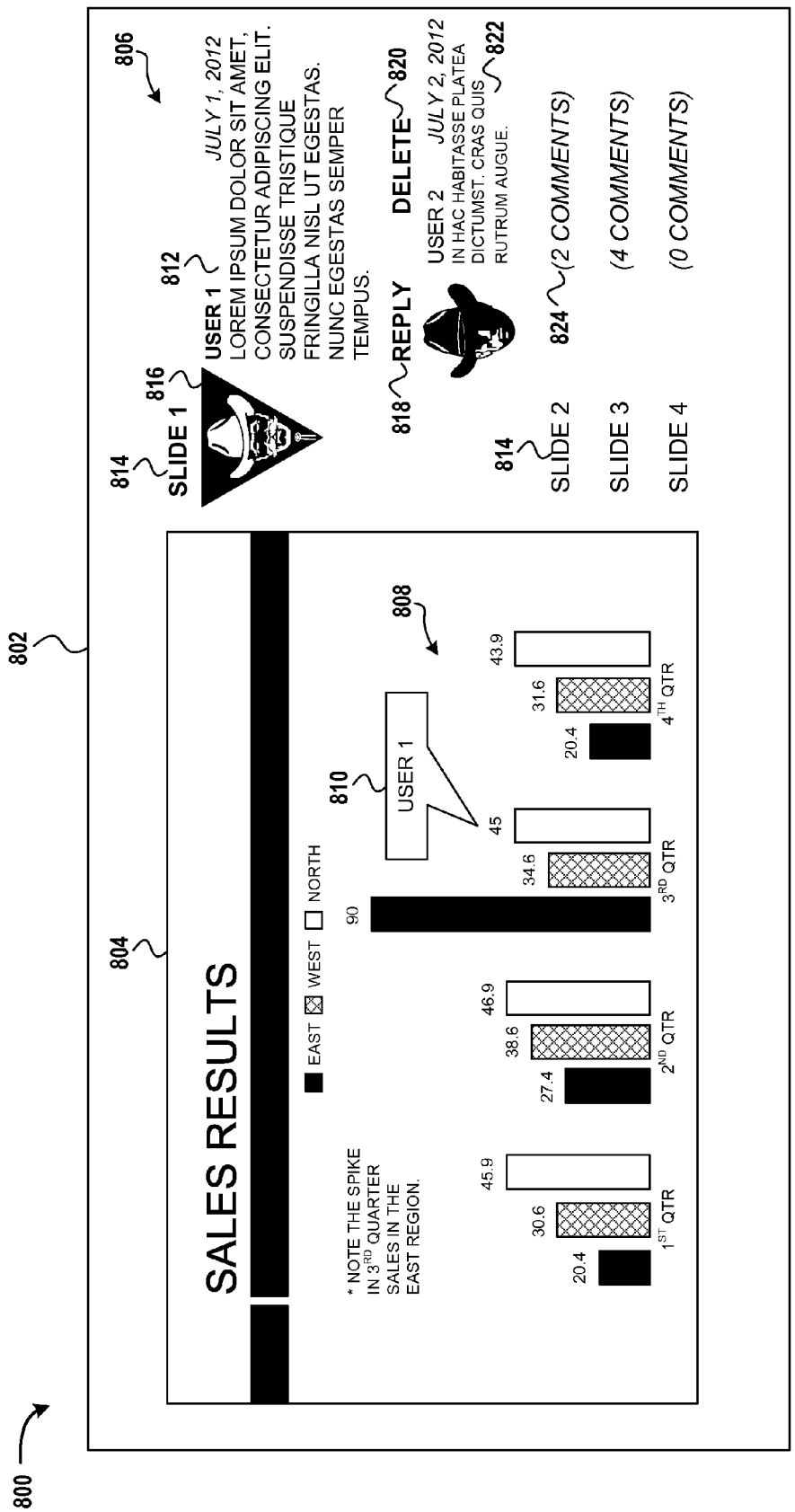
FIG. 8 is a user interface diagram illustrating aspects of a comment interface in a reading mode of a presentation application program, according to an illustrative embodiment.

FIG. 8 is a user interface diagram illustrating aspects of a comment interface in a reading mode of a presentation application program, according to an illustrative embodiment. In the illustrated embodiment, a comment-enabled reading mode user interface 800 provides a comment-enabled reading view window 802 that includes a comment-enabled slide placeholder 804 and a comment placeholder 806.

The comment-enabled slide placeholder 804 is configured to show comment-enabled slide content 808 and a comment call-out 810. The comment-enabled slide content 808 may include text, graphics, videos, hyperlinks, and/or other objects that may be annotated with one or more comments. The comment-enabled slide content 808 may additionally include animations applied to certain objects to enhance the presentation. The comment call-out 810 is configured to provide an indication to the user that a comment exists. In the illustrated embodiment, the comment call-out 810 identifies the commenter as "USER 1". Selection of the comment call-out 810 may cause a corresponding comment 812 to be shown in the comment placeholder 806. Alternatively, any available comments may be displayed in the comment placeholder 806, and selection of the comment call-out 810 may cause the comment 812 to be brought into focus, highlighted, or otherwise made noticeable to the user. Although a single comment call-out 810 is shown, multiple comment call-outs may be included in the comment-enabled slide placeholder 804.

The comment placeholder 806 may be configured to show, in addition to any comments corresponding to comment call-outs included in the comment-enabled slide placeholder 804, a slide identifier 814, a user picture 816, a reply command 818, and a delete command 820, as in the illustrated embodiment. In some embodiments, a notes placeholder, such as the notes placeholder 106 described herein above, includes the comment placeholder 806. In some other embodiments, the notes placeholder 106 and the comment placeholder 806 are displayed together within the comment-enabled reading view window 802. The slide identifier 814 is configured to identify the slide to which the comment 812 is associated. The user picture 816 may display a picture, avatar, or other graphic associated with the commenter (e.g., USER 1). The reply command 818 is configured to allow other commenters (e.g., USER 2) to add a reply 822 to the comment 812. The delete command 820 is configured to delete a comment.

The comment placeholder 806 may also be configured to provide details regarding comments in slides other than the slide that is currently visible in the comment-enabled slide placeholder 804. The comment placeholder 806 is configured to show a comment number identifier 824 to provide a number of comments available in a slide identified by the slide identifier 814. In the illustrated example, a second slide includes two comments, a third slide includes four comments, and a fourth slide includes zero comments.

Figure 9:
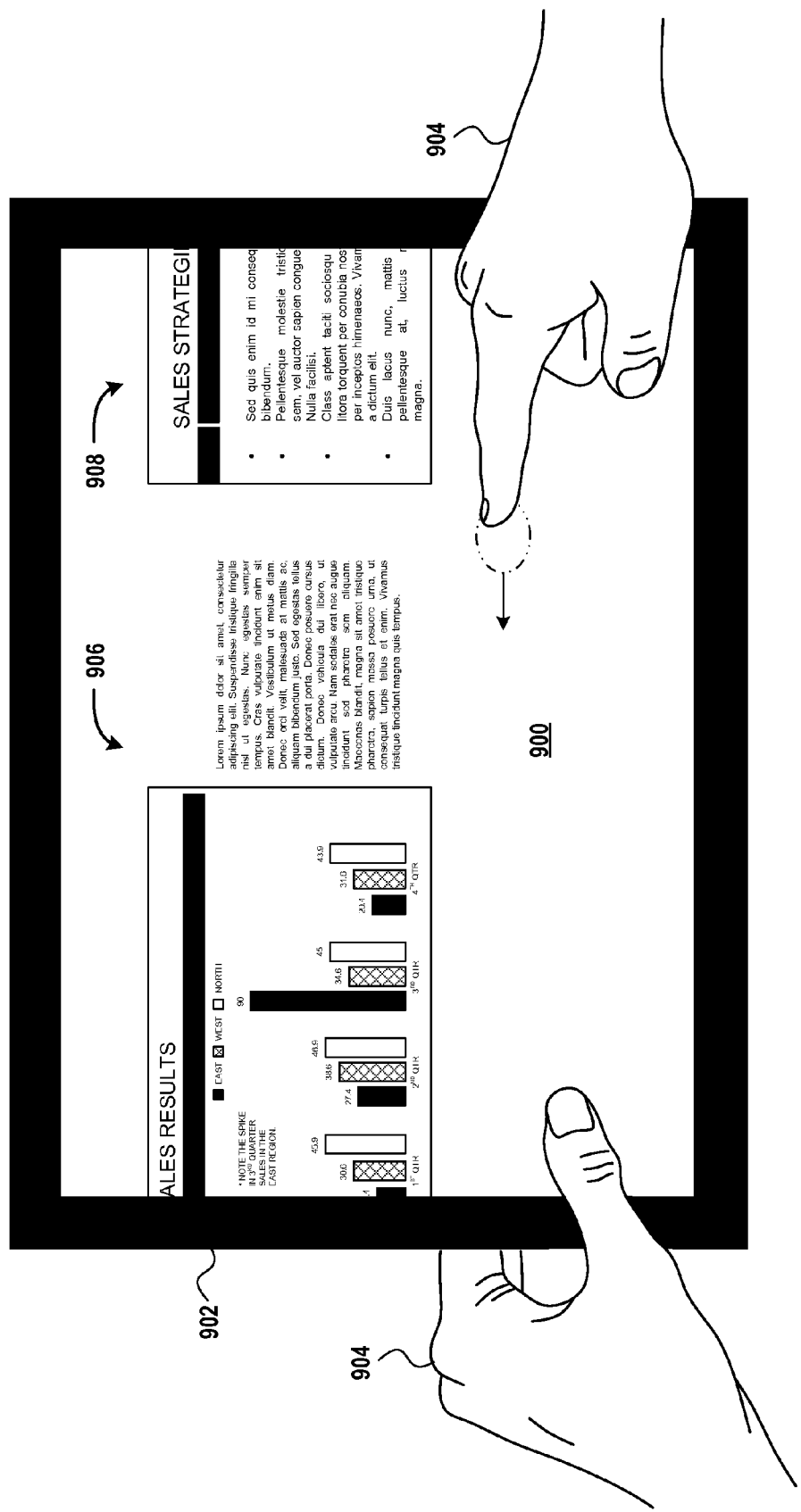
FIG. 9 is a touch user interface diagram illustrating aspects of a touch-enabled reading mode of a presentation application program executing on a touch-enabled device, according to an illustrative embodiment.

FIG. 9 is a touch user interface diagram illustrating aspects of a touch-enabled reading mode user interface 900 of a presentation application program executing on a touch-enabled device 902, according to an illustrative embodiment. As shown, the touch-enabled reading mode user interface 900 allows a user 904 to transition between two slide presentation objects 906/908 using a touch gesture such as swipe. In some embodiments, quicker flicks using a swipe gesture will build momentum and smoothly scroll multiple slide presentation objects across the reading view.

Figure 10:
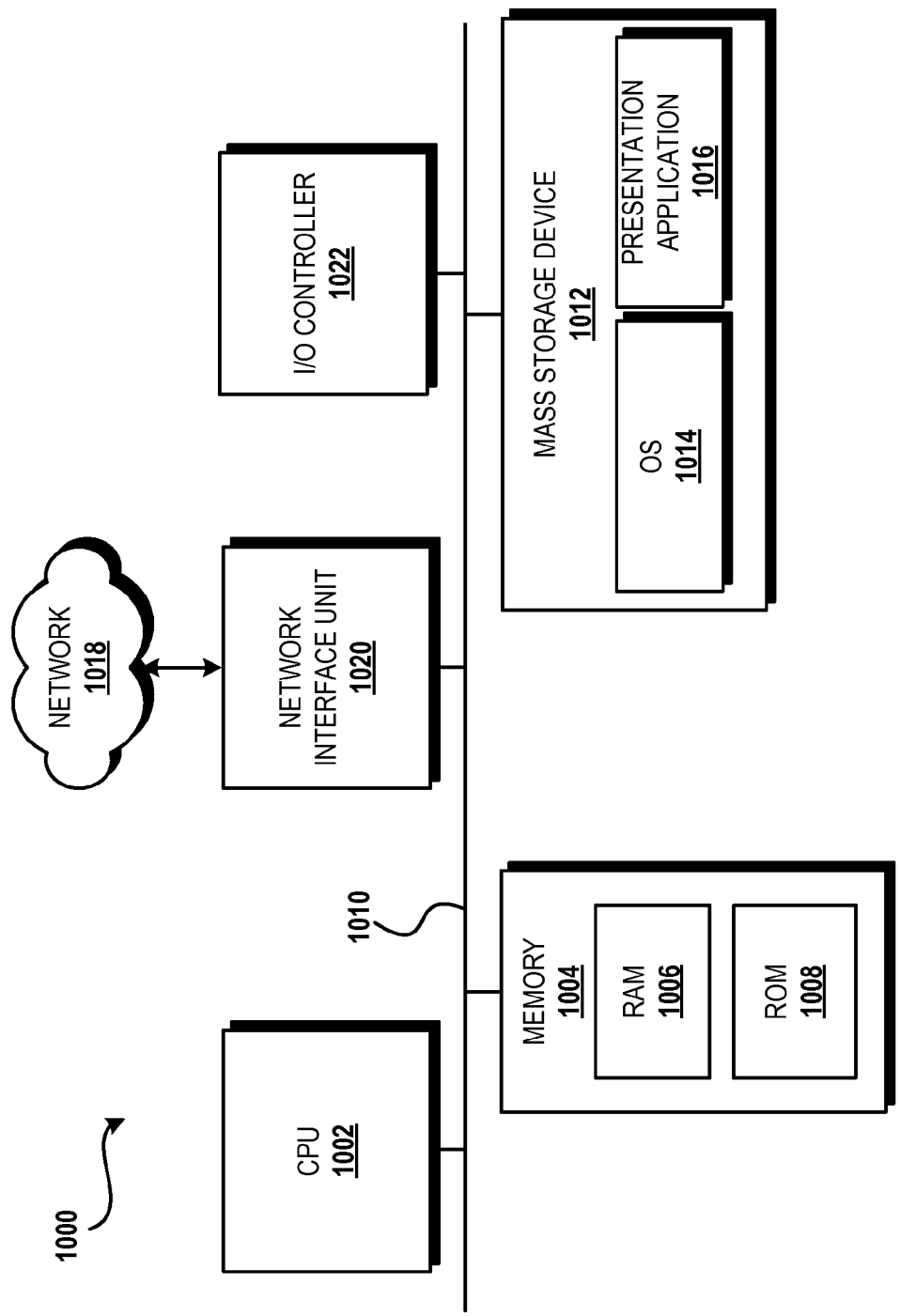
FIG. 10 is a computer architecture diagram illustrating an illustrative computer hardware and software architecture for a computing system capable of implementing aspects of the embodiments presented herein.

FIG. 10 illustrates an illustrative computer architecture 1000 for a device capable of executing the software components described herein for providing interactive slide presentations with accompanying notes in a reading mode of a presentation application program. Thus, the computer architecture 1000 illustrated in FIG. 10 illustrates an architecture for a server computer, mobile phone, a PDA, a smart phone, a desktop computer, a netbook computer, a tablet computer, and/or a laptop computer. The computer architecture 1000 may be utilized to execute any aspects of the software components presented herein.

The computer architecture 1000 illustrated in FIG. 10 includes a central processing unit 1002 ("CPU"), a system memory 1004, including a random access memory 1006 ("RAM") and a read-only memory ("ROM") 1008, and a system bus 1010 that couples the memory 1004 to the CPU 1002. A basic input/output system containing the basic routines that help to transfer information between elements within the computer architecture 1000, such as during startup, is stored in the ROM 1008. The computer architecture 1000 further includes a mass storage device 1012 for storing an operating system 1014 and one or more application programs including, but not limited to, a presentation application program 1016.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1000. For purposes the claims, the phrase "computer storage medium" and variations thereof, does not include waves, signals, and/or other transitory and/or intangible communication media, per se.

According to various embodiments, the computer architecture 1000 may operate in a networked environment using logical connections to remote computers through a network 1018. The computer architecture 1000 may connect to the network 1018 through a network interface unit 1020 connected to the bus 1010. It should be appreciated that the network interface unit 1020 also may be utilized to connect to other types of networks and remote computer systems. The computer architecture 1000 also may include an input/output controller 1022 for receiving and processing input from a number of other devices, including a keyboard, mouse, or electronic stylus (not shown in FIG. 10). Similarly, the input/output controller 1022 may provide output to a display screen, a printer, or other type of output device (also not shown in FIG. 10).

It should be appreciated that the software components described herein may, when loaded into the CPU 1002 and executed, transform the CPU 1002 and the overall computer architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 may include other types of computing devices, including hand-held computers, embedded computer systems, personal digital assistants, and other types of computing devices known to those skilled in the art. It is also contemplated that the computer architecture 1000 may not include all of the components shown in FIG. 10, may include other components that are not explicitly shown in FIG. 10, or may utilize an architecture completely different than that shown in FIG. 10.

Figure 11:
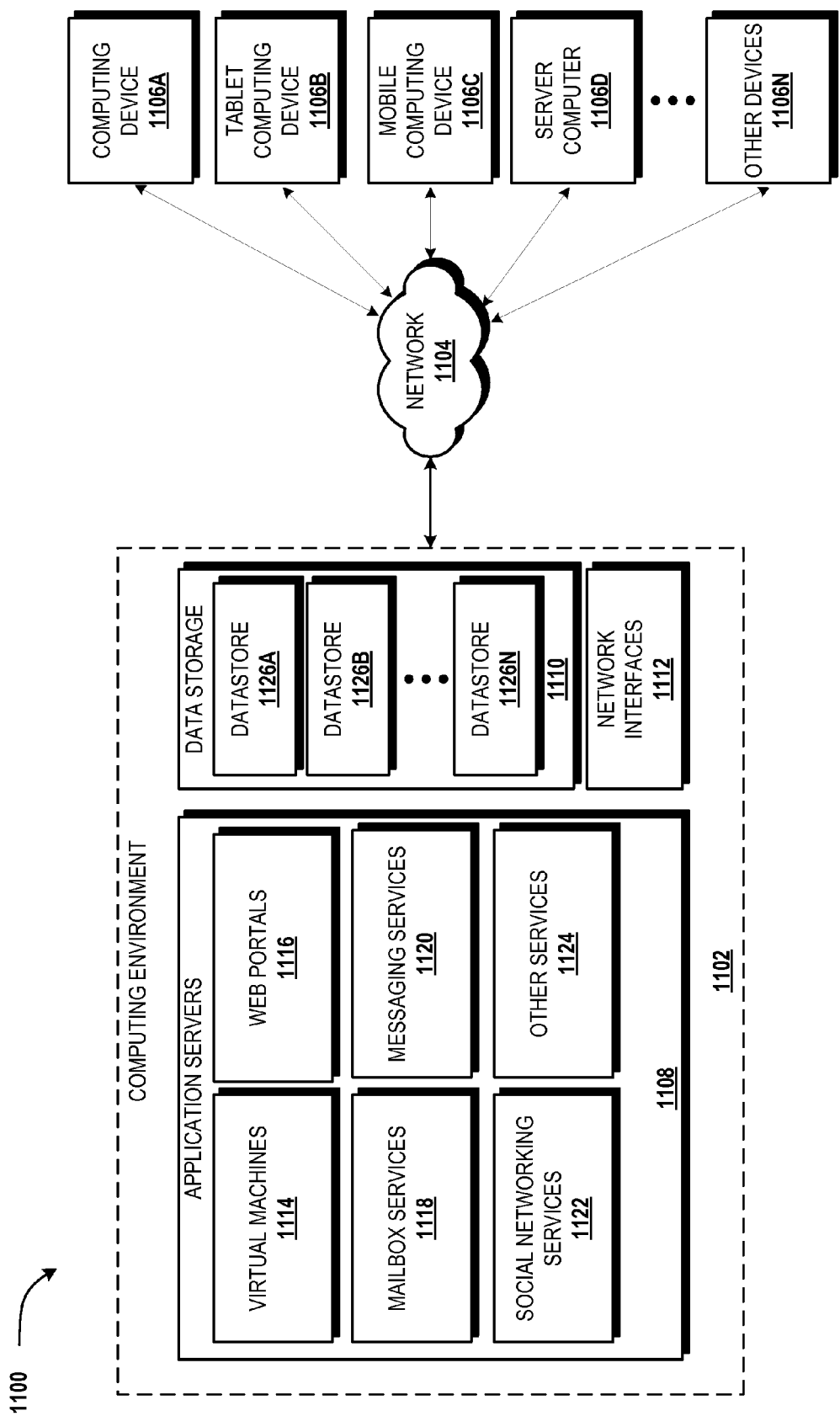
FIG. 11 is a diagram illustrating a distributed computing environment capable of implementing aspects of the embodiments presented herein.

FIG. 11 illustrates an illustrative distributed computing environment 1100 capable of executing the software components described herein for providing interactive slide presentations with accompanying notes in a reading mode of a presentation application program. Thus, the distributed computing environment 1100 illustrated in FIG. 11 can be utilized to execute any aspects of the software components presented herein. For example, the distributed computing environment 1100 can be utilized to execute aspects of the presentation application program described herein.

According to various implementations, the distributed computing environment 1100 includes a computing environment 1102 operating on, in communication with, or as part of the network 1104. The network 1104 also can include various access networks. One or more client devices 1106A-1106N (hereinafter referred to collectively and/or generically as "clients 1106") can communicate with the computing environment 1102 via the network 1104 and/or other connections (not illustrated in FIG. 11). In the illustrated embodiment, the clients 1106 include a computing device 1106A such as a laptop computer, a desktop computer, or other computing device; a slate or tablet computing device ("tablet computing device") 1106B; a mobile computing device 1106C such as a mobile telephone, a smart phone, or other mobile computing device; a server computer 1106D; and/or other devices 1106N. It should be understood that any number of clients 1106 can communicate with the computing environment 1102. Two example computing architectures for the clients 1106 are illustrated and described herein with reference to FIGS. 10 and 12. It should be understood that the illustrated clients 1106 and computing architectures illustrated and described herein are illustrative, and should not be construed as being limited in any way.

In the illustrated embodiment, the computing environment 1102 includes application servers 1108, data storage 1110, and one or more network interfaces 1112. According to various implementations, the functionality of the application servers 1108 can be provided by one or more server computers that are executing as part of, or in communication with, the network 1104. The application servers 1108 can host various services, virtual machines, portals, and/or other resources. In the illustrated embodiment, the application servers 1108 host one or more virtual machines 1114 for hosting applications or other functionality. According to various implementations, the virtual machines 1114 host one or more applications and/or software modules for providing the functionality described herein for providing interactive slide presentations with accompanying notes in a reading mode of a presentation application program. It should be understood that this embodiment is illustrative, and should not be construed as being limiting in any way. The application servers 1108 also host or provide access to one or more Web portals, link pages, Web sites, and/or other information ("Web portals") 1116.

According to various implementations, the application servers 1108 also include one or more mailbox services 1118 and one or more messaging services 1120. The mailbox services 1118 can include electronic mail ("email") services. The mailbox services 1118 also can include various personal information management ("PIM") services including, but not limited to, calendar services, contact management services, collaboration services, and/or other services. The messaging services 1120 can include, but are not limited to, instant messaging services, chat services, forum services, and/or other communication services.

The application servers 1108 also can include one or more social networking services 1122. The social networking services 1122 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 1122 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 1122 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1122 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1122 are not mentioned herein for the sake of brevity. As such, the above embodiments are illustrative, and should not be construed as being limited in any way.

As shown in FIG. 11, the application servers 1108 also can host other services, applications, portals, and/or other resources ("other resources") 1124. The other resources 1124 can include, but are not limited to, a presentation application program. It thus can be appreciated that the computing environment 1102 can provide integration of the concepts and technologies disclosed herein for providing interactive slide presentations with accompanying notes in a reading mode of a presentation application program with various mailbox, messaging, social networking, and/or other services or resources. For example, the concepts and technologies disclosed herein may utilize objects retrieved from various mailbox, messaging, social network, and/or other service or resources for insertion into one or more slides and/or one or more scenes. Animations may be authored for these objects. Moreover, custom animations may be retrieved from these services or resources.

As mentioned above, the computing environment 1102 can include the data storage 1110. According to various implementations, the functionality of the data storage 1110 is provided by one or more databases operating on, or in communication with, the network 1104. The functionality of the data storage 1110 also can be provided by one or more server computers configured to host data for the computing environment 1102. The data storage 1110 can include, host, or provide one or more real or virtual datastores 1126A-1126N (hereinafter referred to collectively and/or generically as "datastores 1126"). The datastores 1126 are configured to host data used or created by the application servers 1108 and/or other data. Although not illustrated in FIG. 11, the datastores 1126 also can host or store objects, animations, and/or other data utilized by a presentation application program.

The computing environment 1102 can communicate with, or be accessed by, the network interfaces 1112. The network interfaces 1112 can include various types of network hardware and software for supporting communications between two or more computing devices including, but not limited to, the clients 1106 and the application servers 1108. It should be appreciated that the network interfaces 1112 also may be utilized to connect to other types of networks and/or computer systems.

It should be understood that the distributed computing environment 1100 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1100 provides the software functionality described herein as a service to the clients 1106. It should be understood that the clients 1106 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 1100 to utilize the functionality described herein for providing interactive slide presentations with accompanying notes in a reading mode of a presentation application program.

Figure 12:
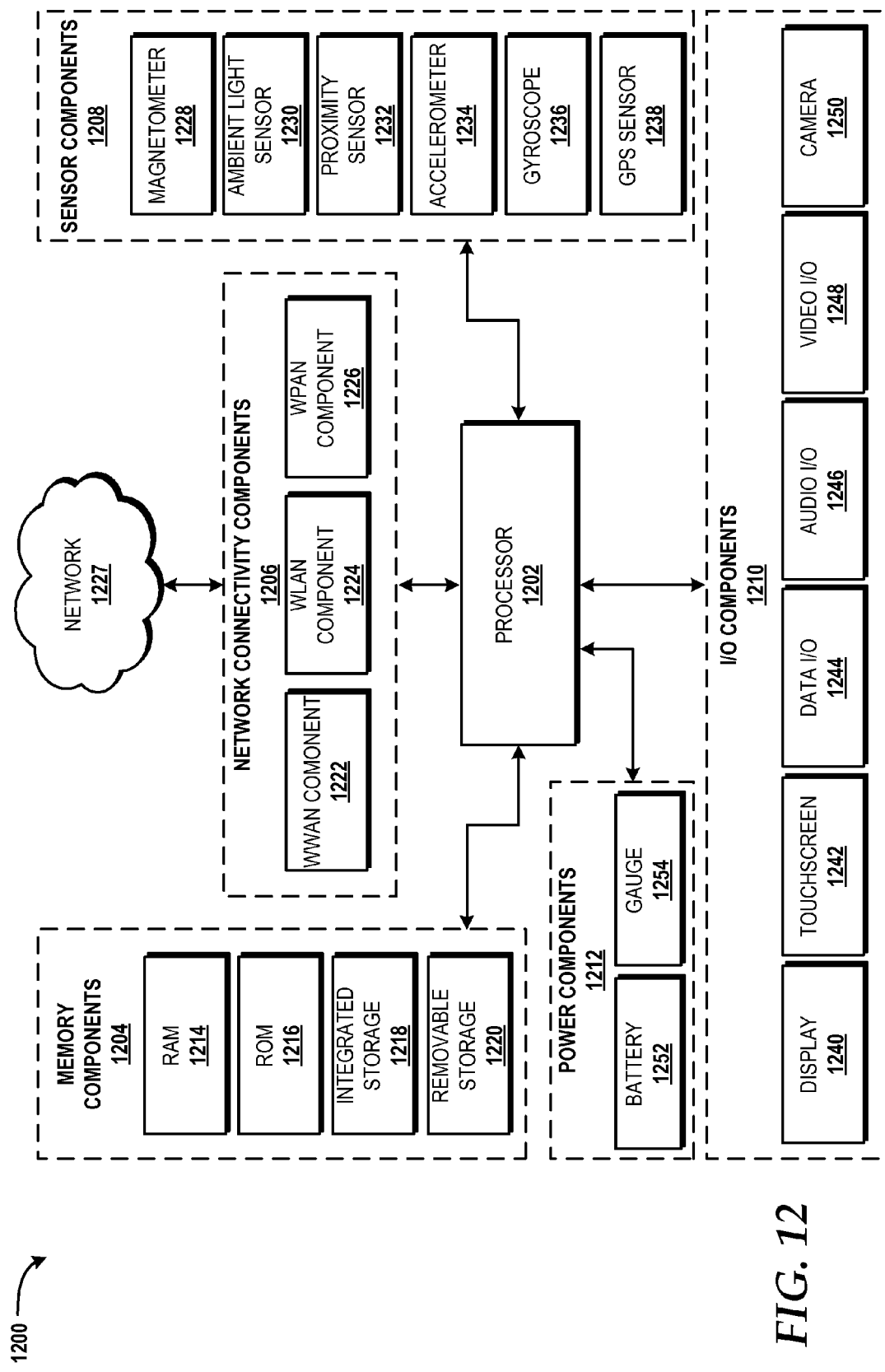
FIG. 12 is a computer architecture diagram illustrating a computing device architecture capable of implementing aspects of the embodiments presented herein.

Turning now to FIG. 12, an illustrative computing device architecture 1200 for a computing device that is capable of executing various software components described herein for providing interactive slide presentations with accompanying notes in a reading mode of a presentation application program. The computing device architecture 1200 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. The computing device architecture 1200 is applicable to any of the clients 1106 shown in FIG. 11. Moreover, aspects of the computing device architecture 1200 may be applicable to traditional desktop computers, portable computers (e.g., laptops, notebooks, ultra-portables, and netbooks), server computers, and other computer systems, such as described herein with reference to FIG. 12. For example, the single touch and multi-touch aspects disclosed herein below may be applied to desktop computers that utilize a touchscreen or some other touch-enabled device, such as a touch-enabled track pad or touch-enabled mouse.

The computing device architecture 1200 illustrated in FIG. 12 includes a processor 1202, memory components 1204, network connectivity components 1206, sensor components 1208, input/output components 1210, and power components 1212. In the illustrated embodiment, the processor 1202 is in communication with the memory components 1204, the network connectivity components 1206, the sensor components 1208, the input/output ("I/O") components 1210, and the power components 1212. Although no connections are shown between the individuals components illustrated in FIG. 12, the components can interact to carry out device functions. In some embodiments, the components are arranged so as to communicate via one or more busses (not shown).

The processor 1202 includes a central processing unit ("CPU") configured to process data, execute computer-executable instructions of one or more application programs, and communicate with other components of the computing device architecture 1200 in order to perform various functionality described herein. The processor 1202 may be utilized to execute aspects of the software components presented herein and, particularly, those that utilize, at least in part, a touch-enabled input.

In some embodiments, the processor 1202 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and higher resolution), video games, three-dimensional ("3D") modeling applications, and the like. In some embodiments, the processor 1202 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 1202 is, or is included in, a system-on-chip ("SoC") along with one or more of the other components described herein below. For example, the SoC may include the processor 1202, a GPU, one or more of the network connectivity components 1206, and one or more of the sensor components 1208. In some embodiments, the processor 1202 is fabricated, in part, utilizing a package-on-package ("PoP") integrated circuit packaging technique. Moreover, the processor 1202 may be a single core or multi-core processor.

The processor 1202 may be created in accordance with an ARM architecture, available for license from ARM HOLDINGS of Cambridge, United Kingdom. Alternatively, the processor 1202 may be created in accordance with an x86 architecture, such as is available from INTEL CORPORATION of Mountain View, Calif. and others. In some embodiments, the processor 1202 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1204 include a random access memory ("RAM") 1214, a read-only memory ("ROM") 1216, an integrated storage memory ("integrated storage") 1218, and a removable storage memory ("removable storage") 1220. In some embodiments, the RAM 1214 or a portion thereof, the ROM 1216 or a portion thereof, and/or some combination the RAM 1214 and the ROM 1216 is integrated in the processor 1202. In some embodiments, the ROM 1216 is configured to store a firmware, an operating system or a portion thereof (e.g., operating system kernel), and/or a bootloader to load an operating system kernel from the integrated storage 1218 or the removable storage 1220.

The integrated storage 1218 can include a solid-state memory, a hard disk, or a combination of solid-state memory and a hard disk. The integrated storage 1218 may be soldered or otherwise connected to a logic board upon which the processor 1202 and other components described herein also may be connected. As such, the integrated storage 1218 is integrated in the computing device. The integrated storage 1218 is configured to store an operating system or portions thereof, application programs, data, and other software components described herein.

The removable storage 1220 can include a solid-state memory, a hard disk, or a combination of solid-state memory and a hard disk. In some embodiments, the removable storage 1220 is provided in lieu of the integrated storage 1218. In other embodiments, the removable storage 1220 is provided as additional optional storage. In some embodiments, the removable storage 1220 is logically combined with the integrated storage 1218 such that the total available storage is made available and shown to a user as a total combined capacity of the integrated storage 1218 and the removable storage 1220.

The removable storage 1220 is configured to be inserted into a removable storage memory slot (not shown) or other mechanism by which the removable storage 1220 is inserted and secured to facilitate a connection over which the removable storage 1220 can communicate with other components of the computing device, such as the processor 1202. The removable storage 1220 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1204 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1206 include a wireless wide area network component ("WWAN component") 1222, a wireless local area network component ("WLAN component") 1224, and a wireless personal area network component ("WPAN component") 1226. The network connectivity components 1206 facilitate communications to and from a network 1227, which may be a WWAN, a WLAN, or a WPAN. Although a single network 1227 is illustrated, the network connectivity components 1206 may facilitate simultaneous communication with multiple networks. For example, the network connectivity components 1206 may facilitate simultaneous communications with multiple networks via one or more of a WWAN, a WLAN, or a WPAN.

The network 1227 may be a WWAN, such as a mobile telecommunications network utilizing one or more mobile telecommunications technologies to provide voice and/or data services to a computing device utilizing the computing device architecture 1200 via the WWAN component 1222. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1227 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1227 may be configured to provide voice and/or data communications with any combination of the above technologies. The network 1227 may be configured to or adapted to provide voice and/or data communications in accordance with future generation technologies.

In some embodiments, the WWAN component 1222 is configured to provide dual-multi-mode connectivity to the network 1227. For example, the WWAN component 1222 may be configured to provide connectivity to the network 1227, wherein the network 1227 provides service via GSM and UMTS technologies, or via some other combination of technologies. Alternatively, multiple WWAN components 1222 may be utilized to perform such functionality, and/or provide additional functionality to support other non-compatible technologies (i.e., incapable of being supported by a single WWAN component). The WWAN component 1222 may facilitate similar connectivity to multiple networks (e.g., a UMTS network and an LTE network).

The network 1227 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 1224 is configured to connect to the network 1227 via the WI-FI access points. Such connections may be secured via various encryption technologies including, but not limited, WI-FI Protected Access ("WPA"), WPA2, Wired Equivalent Privacy ("WEP"), and the like.

The network 1227 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 1226 is configured to facilitate communications with other devices, such as peripherals, computers, or other computing devices via the WPAN.

The sensor components 1208 include a magnetometer 1228, an ambient light sensor 1230, a proximity sensor 1232, an accelerometer 1234, a gyroscope 1236, and a Global Positioning System sensor ("GPS sensor") 1238. It is contemplated that other sensors, such as, but not limited to, temperature sensors or shock detection sensors, also may be incorporated in the computing device architecture 1200.

The magnetometer 1228 is configured to measure the strength and direction of a magnetic field. In some embodiments the magnetometer 1228 provides measurements to a compass application program stored within one of the memory components 1204 in order to provide a user with accurate directions in a frame of reference including the cardinal directions, north, south, east, and west. Similar measurements may be provided to a navigation application program that includes a compass component. Other uses of measurements obtained by the magnetometer 1228 are contemplated.

The ambient light sensor 1230 is configured to measure ambient light. In some embodiments, the ambient light sensor 1230 provides measurements to an application program stored within one the memory components 1204 in order to automatically adjust the brightness of a display (described below) to compensate for low-light and high-light environments. Other uses of measurements obtained by the ambient light sensor 1230 are contemplated.

The proximity sensor 1232 is configured to detect the presence of an object or thing in proximity to the computing device without direct contact. In some embodiments, the proximity sensor 1232 detects the presence of a user's body (e.g., the user's face) and provides this information to an application program stored within one of the memory components 1204 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1232 are contemplated.

The accelerometer 1234 is configured to measure proper acceleration. In some embodiments, output from the accelerometer 1234 is used by an application program as an input mechanism to control some functionality of the application program. For example, the application program may be a video game in which a character, a portion thereof, or an object is moved or otherwise manipulated in response to input received via the accelerometer 1234. In some embodiments, output from the accelerometer 1234 is provided to an application program for use in switching between landscape and portrait modes, calculating coordinate acceleration, or detecting a fall. Other uses of the accelerometer 1234 are contemplated.

The gyroscope 1236 is configured to measure and maintain orientation. In some embodiments, output from the gyroscope 1236 is used by an application program as an input mechanism to control some functionality of the application program. For example, the gyroscope 1236 can be used for accurate recognition of movement within a 3D environment of a video game application or some other application. In some embodiments, an application program utilizes output from the gyroscope 1236 and the accelerometer 1234 to enhance control of some functionality of the application program. Other uses of the gyroscope 1236 are contemplated.

The GPS sensor 1238 is configured to receive signals from GPS satellites for use in calculating a location. The location calculated by the GPS sensor 1238 may be used by any application program that requires or benefits from location information. For example, the location calculated by the GPS sensor 1238 may be used with a navigation application program to provide directions from the location to a destination or directions from the destination to the location. Moreover, the GPS sensor 1238 may be used to provide location information to an external location-based service, such as E911 service. The GPS sensor 1238 may obtain location information generated via WI-FI, WIMAX, and/or cellular triangulation techniques utilizing one or more of the network connectivity components 1206 to aid the GPS sensor 1238 in obtaining a location fix. The GPS sensor 1238 may also be used in Assisted GPS ("A-GPS") systems.

The I/O components 1210 include a display 1240, a touchscreen 1242, a data I/O interface component ("data I/O") 1244, an audio I/O interface component ("audio I/O") 1246, a video I/O interface component ("video I/O") 1248, and a camera 1250. In some embodiments, the display 1240 and the touchscreen 1242 are combined. In some embodiments two or more of the data I/O component 1244, the audio I/O component 1246, and the video I/O component 1248 are combined. The I/O components 1210 may include discrete processors configured to support the various interface described below, or may include processing functionality built-in to the processor 1202.

The display 1240 is an output device configured to present information in a visual form. In particular, the display 1240 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 1240 is a liquid crystal display ("LCD") utilizing any active or passive matrix technology and any backlighting technology (if used). In some embodiments, the display 1240 is an organic light emitting diode ("OLED") display. Other display types are contemplated.

The touchscreen 1242 is an input device configured to detect the presence and location of a touch. The touchscreen 1242 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 1242 is incorporated on top of the display 1240 as a transparent layer to enable a user to use one or more touches to interact with objects or other information presented on the display 1240. In other embodiments, the touchscreen 1242 is a touch pad incorporated on a surface of the computing device that does not include the display 1240. For example, the computing device may have a touchscreen incorporated on top of the display 1240 and a touch pad on a surface opposite the display 1240.

In some embodiments, the touchscreen 1242 is a single-touch touchscreen. In other embodiments, the touchscreen 1242 is a multi-touch touchscreen. In some embodiments, the touchscreen 1242 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1242. As such, a developer may create gestures that are specific to a particular application program.

In some embodiments, the touchscreen 1242 supports a tap gesture in which a user taps the touchscreen 1242 once on an item presented on the display 1240. The tap gesture may be used for various reasons including, but not limited to, opening or launching whatever the user taps. In some embodiments, the touchscreen 1242 supports a double tap gesture in which a user taps the touchscreen 1242 twice on an item presented on the display 1240. The double tap gesture may be used for various reasons including, but not limited to, zooming in or zooming out in stages. In some embodiments, the touchscreen 1242 supports a tap and hold gesture in which a user taps the touchscreen 1242 and maintains contact for at least a pre-defined time. The tap and hold gesture may be used for various reasons including, but not limited to, opening a context-specific menu.

In some embodiments, the touchscreen 1242 supports a pan gesture in which a user places a finger on the touchscreen 1242 and maintains contact with the touchscreen 1242 while moving the finger on the touchscreen 1242. The pan gesture may be used for various reasons including, but not limited to, moving through screens, images, or menus at a controlled rate. Multiple finger pan gestures are also contemplated. In some embodiments, the touchscreen 1242 supports a flick gesture in which a user swipes a finger in the direction the user wants the screen to move. The flick gesture may be used for various reasons including, but not limited to, scrolling horizontally or vertically through menus, pages, slides, or presentation objects. In some embodiments, the touchscreen 1242 supports a pinch and stretch gesture in which a user makes a pinching motion with two fingers (e.g., thumb and forefinger) on the touchscreen 1242 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1242. As such, the above gestures should be understood as being illustrative and should not be construed as being limiting in any way.

The data I/O interface component 1244 is configured to facilitate input of data to the computing device and output of data from the computing device. In some embodiments, the data I/O interface component 1244 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 1246 is configured to provide audio input and/or output capabilities to the computing device. In some embodiments, the audio I/O interface component 1244 includes a microphone configured to collect audio signals. In some embodiments, the audio I/O interface component 1244 includes a headphone jack configured to provide connectivity for headphones or other external speakers. In some embodiments, the audio interface component 1246 includes a speaker for the output of audio signals. In some embodiments, the audio I/O interface component 1244 includes an optical audio cable out.

The video I/O interface component 1248 is configured to provide video input and/or output capabilities to the computing device. In some embodiments, the video I/O interface component 1248 includes a video connector configured to receive video as input from another device (e.g., a video media player such as a DVD or BLURAY player) or send video as output to another device (e.g., a monitor, a television, or some other external display). In some embodiments, the video I/O interface component 1248 includes a High-Definition Multimedia Interface ("HDMI"), mini-HDMI, micro-HDMI, DisplayPort, or proprietary connector to input/output video content. In some embodiments, the video I/O interface component 1248 or portions thereof is combined with the audio I/O interface component 1246 or portions thereof.

The camera 1250 can be configured to capture still images and/or video. The camera 1250 may utilize a charge coupled device ("CCD") or a complementary metal oxide semiconductor ("CMOS") image sensor to capture images. In some embodiments, the camera 1250 includes a flash to aid in taking pictures in low-light environments. Settings for the camera 1250 may be implemented as hardware or software buttons.

Although not illustrated, one or more hardware buttons may also be included in the computing device architecture 1200. The hardware buttons may be used for controlling some operational aspect of the computing device. The hardware buttons may be dedicated buttons or multi-use buttons. The hardware buttons may be mechanical or sensor-based.

The illustrated power components 1212 include one or more batteries 1252, which can be connected to a battery gauge 1254. The batteries 1252 may be rechargeable or disposable. Rechargeable battery types include, but are not limited to, lithium polymer, lithium ion, nickel cadmium, and nickel metal hydride. Each of the batteries 1252 may be made of one or more cells.

The battery gauge 1254 can be configured to measure battery parameters such as current, voltage, and temperature. In some embodiments, the battery gauge 1454 is configured to measure the effect of a battery's discharge rate, temperature, age and other factors to predict remaining life within a certain percentage of error. In some embodiments, the battery gauge 1254 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1212 may also include a power connector, which may be combined with one or more of the aforementioned I/O components 1210. The power components 1212 may interface with an external power system or charging equipment via a power I/O component.

Based on the foregoing, it should be appreciated that concepts and technologies for have been disclosed herein for providing interactive slide presentations with accompanying notes in a reading mode of a presentation application program. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method comprising computer-implemented operations for:
   providing, by a computer, a reading mode user interface comprising a cohesive presentation object, the cohesive presentation object comprising a slide placeholder and an adjacent notes placeholder;
   displaying within the slide placeholder, by the computer, slide content and a comment call-out user interface control configured to provide an indication that a corresponding comment exists, the indication identifying a commenter; and
   displaying within the adjacent notes placeholder, by the computer, presentation notes providing context for the slide content, a comment placeholder that identifies the commenter and that is configured to show the corresponding comment, a first user interface control that, when selected, is configured to cause the corresponding comment to be deleted, and a second user interface control that, when selected, is configured to cause a reply to the corresponding comment to be added;
   receiving, by the computer, an input to interact with the slide content in the reading mode user interface; and
   manipulating, by the computer, the slide content in response to the input to interact with the slide content.

2. The computer-implemented method of claim 1, further comprising receiving, by the computer, an input to advance to a new cohesive presentation object, the new cohesive presentation object comprising a new slide placeholder comprising no comment call-out user interface controls and a new notes placeholder comprising no characters or comments.

3. The computer-implemented method of claim 2, further comprising, in response to the input to advance to the new cohesive presentation object, moving the cohesive presentation object out of a view and the new cohesive presentation object into the view.

4. The computer-implemented method of claim 1, further comprising displaying the corresponding comment in response to receiving a selection of the comment call-out user interface control.

5. The computer-implemented method of claim 1, further comprising highlighting the corresponding comment in response to receiving a selection of the comment call-out user interface control.

6. The computer-implemented method of claim 1, wherein manipulating, by the computer, the slide content, comprises playback of one or more animations associated with one or more objects contained within the slide content.

7. The computer-implemented method of claim 1, further comprising causing the corresponding comment to be in focus in response to receiving a selection of the comment call-out user interface control.

8. The computer-implemented method of claim 1, wherein the comment call-out user-interface control identifies the commenter responsible for making the corresponding comment.

9. A computer-readable storage medium comprising computer-executable instructions that, when executed by a computer, cause the computer to:
present, on a display that is in communication with the computer, a reading mode user interface comprising a cohesive presentation object that represents slide content and presentation notes, the cohesive presentation object comprising:
a slide placeholder configured to show the slide content and a comment call-out user interface control configured to provide an indication that a corresponding comment exists, the indication identifying a commenter; and
a notes placeholder adjacent to the slide placeholder configured to show the presentation notes that provide context for the slide content, a comment placeholder that identifies the commenter and that is configured to show the corresponding comment, a first user interface control that, when selected, is configured to cause the corresponding comment to be deleted, and a second user interface control that, when selected, is configured to cause a reply to the corresponding comment to be added;
receive an input to advance from the cohesive presentation object to a new cohesive presentation object;
in response to the input to advance from the cohesive presentation object to the new cohesive presentation object, move the cohesive presentation object out of a view and the new cohesive presentation object into the view, wherein the new cohesive presentation object comprises a new slide placeholder and a new notes placeholder, the new slide placeholder comprising new slide content and the new notes placeholder being empty; and
cause the computer to scale the new slide placeholder to a larger size than the slide placeholder upon moving the new cohesive presentation object into the view.

10. The computer-readable storage medium of claim 9, further comprising computer-executable instructions that, when executed by the computer, cause the computer to:
receive an input to interact with the slide content comprising a selection of a hyperlink contained within the slide content; and
manipulate the slide content in response to the input to interact with the slide content.

11. The computer-readable storage medium of claim 9, further comprising computer-executable instructions that, when executed by the computer, cause the computer to display the corresponding comment in response to receiving a selection of the comment call-out user interface control.

12. The computer-readable storage medium of claim 9, further comprising computer-executable instructions that, when executed by the computer, cause the computer to highlight the corresponding comment in response to receiving a selection of the comment call-out user interface control.

13. The computer-readable storage medium of claim 10, wherein manipulating the slide content comprises playback of one or more animations associated with one or more objects contained within the slide content.

14. The computer-readable storage medium of claim 9, further comprising computer-executable instructions that, when executed by the computer, cause the computer to cause the corresponding comment to be in focus in response to receiving a selection of the comment call-out user interface control.

15. The computer-readable storage medium of claim 9, wherein the comment call-out user-interface control identifies the commenter responsible for making the corresponding comment.

16. An apparatus comprising:
a processor; and
a computer-readable storage medium having instructions stored thereon which, when executed by a computer, cause the apparatus to:
present, on a display that is in communication with the computer, a slide presentation in a reading mode user interface of a presentation application program, the reading mode user interface being configured to represent, for a first slide in the slide presentation,
a first slide placeholder comprising first slide content and a comment call-out user interface control configured to provide an indication that a corresponding comment exists, the indication identifying a commenter, and
a first notes placeholder adjacent to the first slide placeholder and comprising first presentation notes that provide context for the first slide content, a comment placeholder that identifies the commenter and that is configured to show the corresponding comment, a first user interface control that, when selected, is configured to cause the corresponding comment to be deleted, and a second user interface control that, when selected, is configured to cause a reply to the corresponding comment to be added,
the first slide placeholder and the first notes placeholder being represented as a first cohesive presentation object; and
provide a navigation model for switching between the first cohesive presentation object and another cohesive presentation object;
receive, via the reading mode user interface, an input to utilize the navigation model to switch from the first slide in the slide presentation to a second slide in the slide presentation, the second slide being represented as a second cohesive presentation object comprising second slide content in a second slide placeholder; and
in response to receiving the input to utilize the navigation model to switch from the first slide in the slide presentation to the second slide in the slide presentation, advance the slide presentation from the first slide to the second slide by moving the first cohesive presentation object out of a view and the second cohesive presentation object into the view.

17. The apparatus of claim 16, wherein the computer-executable instructions further cause the apparatus to scale the second slide placeholder to be larger than the first slide placeholder.

18. The apparatus of claim 17, wherein the computer-executable instructions further cause the apparatus to:
receive, via the reading mode user interface, an input to utilize the navigation model to switch from the second slide in the slide presentation to a third slide in the slide presentation, the third slide being represented as a third cohesive presentation object comprising third slide content in a third slide placeholder and third presentation notes in a third presentation notes placeholder;
in response to the input to utilize the navigation model to switch from the second slide in the slide presentation to a third slide in the slide presentation, advance the slide presentation from the second slide to the third slide by moving the second cohesive presentation object out of the view and the third cohesive presentation object into the view; and
scale the third slide placeholder to be smaller than the second slide placeholder to accommodate the third notes placeholder in the view.

19. The apparatus of claim 16, wherein the computer-executable instructions further cause the apparatus to at least one of:
cause the computer to display the corresponding comment in response to receiving a selection of the comment call-out user interface control; or
cause the computer to highlight the corresponding comment in response to receiving the selection of the comment call-out user interface control.

20. The apparatus of claim 16, wherein the computer-executable instructions further cause the apparatus to cause the corresponding comment to be in focus in response to receiving a selection of the comment call-out user interface control.

* * * * *